(12) United States Patent
Ballantine et al.

(10) Patent No.: US 6,282,459 B1
(45) Date of Patent: Aug. 28, 2001

(54) STRUCTURE AND METHOD FOR DETECTION OF PHYSICAL INTERFERENCE DURING TRANSPORT OF AN ARTICLE

(75) Inventors: Arne W. Ballantine, South Burlington; Emily E. Fisch, Burlington; Ronald A. Warren, Essex Junction, all of VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/144,734

(22) Filed: Sep. 1, 1998

(51) Int. Cl.⁷ .................................................. G06F 19/00
(52) U.S. Cl. ...................... 700/245; 700/101; 700/102; 700/111; 700/121; 318/568.1; 318/568.12; 318/568.16; 318/568.21; 414/217; 414/227; 414/730; 414/941; 235/462.15; 235/375; 438/220; 438/231
(58) Field of Search ................................. 700/121, 101, 700/102, 111, 245; 318/568.1, 568.16, 568.12, 568.21; 414/217, 730, 938, 941, 227; 294/103.1, 902, 907, 119.1; 901/30, 39; 701/23; 235/462.15, 454, 375, 462.01, 475; 438/220, 231, 232

(56) References Cited

U.S. PATENT DOCUMENTS

| | | | |
|---|---|---|---|
| 4,813,732 | | 3/1989 | Klem ................................. 294/103.1 |
| 4,816,732 | | 3/1989 | Wilson ............................. 318/568.21 |
| 5,557,263 | * | 9/1996 | Fisher et al. ......................... 340/605 |
| 5,668,452 | | 9/1997 | Villarreal et al. ............... 318/568.16 |
| 5,700,046 | * | 12/1997 | Van Doren et al. ............... 294/119.1 |
| 5,818,018 | * | 10/1998 | Conboy et al. ....................... 235/375 |
| 5,883,374 | * | 3/1999 | Mathews ......................... 235/462.15 |
| 6,161,054 | * | 12/2000 | Rosenthal et al. .................... 700/121 |

FOREIGN PATENT DOCUMENTS

| | | | |
|---|---|---|---|
| 63-127888 | 5/1988 | (JP) | ............................... B25J/13/08 |
| 6-349930 | 12/1994 | (JP) | ............................... B25J/17/02 |
| 8-47882 | 2/1996 | (JP) | ................................. B25J/9/10 |

OTHER PUBLICATIONS

Wang et al., an Automated Loading and Unloading System for a Maglev wafer Transport Path, 1997, IEEE, pp. 276–279.*

Venkatesh et al., A Steady–State Throughput Analysis of Cluster Tools: Dual–Blade Versus Single–Blade Robots, 1997, IEEE, pp. 418–424.*

* cited by examiner

Primary Examiner—William A. Cuchlinski, Jr.
Assistant Examiner—McDieunel Marc
(74) Attorney, Agent, or Firm—Ratner & Prestia; James M. Leas, Agent

(57) ABSTRACT

A method for detecting physical interference with desired transport of an article. The method includes the step of detecting an operative acoustic signal representing the structure-borne sound pattern of an article during said article transport, and detecting the presence of interference based on the acoustic signal. A system for performing the method includes a transport device adapted to transport the article through a predetermined path and an acoustic sensor in structure-borne acoustic contact with the transport device and capable of producing an acoustic signal indicative of physical interference.

32 Claims, 3 Drawing Sheets

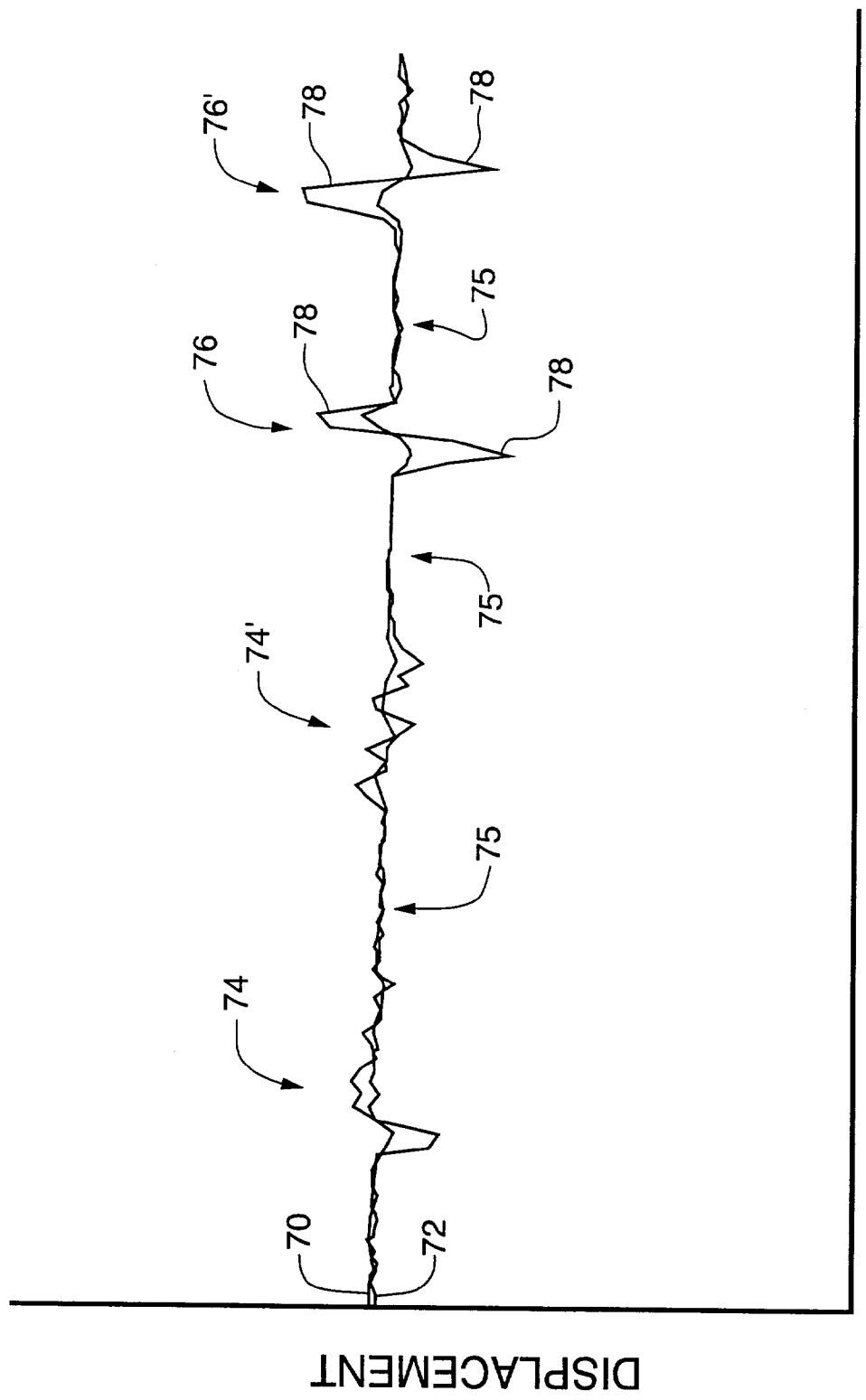

US 6,282,459 B1

STRUCTURE AND METHOD FOR DETECTION OF PHYSICAL INTERFERENCE DURING TRANSPORT OF AN ARTICLE

TECHNICAL FIELD

The present invention relates generally to the detection of physical interference during transport of an article and, more specifically, to a structure and method for detection of robot handling errors.

BACKGROUND OF THE INVENTION

Robotic devices are used in many processes for transport of articles in predetermined paths. For instance, robots are used in semiconductor manufacturing to perform tasks such as selecting semiconductor wafers from carrier cassettes, placing them in process chambers, moving them between process chambers, and placing them back into cassettes for transport to a subsequent operation. These robots must operate at very high speeds to assure that tool throughput is not limited by wafer transport, but must also place wafers at their desired location within fractions of a millimeter in three-dimensional space. Because of these requirements, robots used in semiconductor manufacturing are taught the locations for picking up, transporting, and depositing wafers, and are expected to consistently maneuver precisely among those locations repeatedly for months at a time.

If wafers are misplaced by even a small amount, several handling errors are possible. These errors may become evident by some type of physical interference during wafer transport. The wafer may scrape or hit a tool or cassette surface, resulting in either broken wafers or scratched wafer surfaces that ruin any chips at the scratched location. In addition, the robot may cause impact collisions between the wafer and tool surfaces that are too slight to break wafers, but are sufficient to nick the wafer edge. These nicked wafers are then highly likely to break during high-stress process steps such as the polish or heat treatment steps. Finally, the robot itself may be the source of physical interference via rubbing at a joint or on a tool surface, resulting in elevated levels of foreign material particulate matter that may lead to decreased wafer yield and lower productivity.

No real-time method is available to determine if misaligned wafer placement is causing scratches or collisions, or to determine if the robot is rubbing against a surface and causing particulate generation. Periodic foreign material checks will not catch an intermittent problem or find a problem that is just beginning. Because often the same type of robot is used on multiple types of process tools, it is difficult to determine which robot is responsible once a problem has been identified. This difficulty is exacerbated if the problem is intermittent.

Several systems are known for sensing or preventing robot handling errors, including the use of force sensors, strain gauges, or limit switches on the robot arm. Such systems are capable of detecting large or forceful collisions. They cannot detect, however, the very slight physical interference produced by gently scratching or nicking the wafer on a tool surface, or by rubbing at the robot joints.

It is also known to mount active acoustic or light-radiation devices on robots to actively generate a "visual" map of the robot environment, from which the robot makes navigation decisions and avoids collisions. Such systems require a great deal of resources dedicated to active monitoring and mapping. They still may not detect slight physical interference, however, such as rubbing of parts of the robot not within the field of "vision."

The use of magnetic fields created by placing magnetic strips in the robot arm and in the tool area, and using a field sensor to detect abnormalities in a previously characterized field pattern, has also been used to sense collisions. Such a pattern may not detect slight physical interference between wafers and work surfaces, however, because the relationship between the robot and the tool may be essentially the same for a non-interfering motion and a slight interfering motion. Also, the specific set-up required for mapping every robot motion and every robot geometry is time-consuming and expensive.

In view of the shortcomings of the known systems, there remains a need for an improved structure and method for detection of robot handling errors.

SUMMARY OF THE INVENTION

To meet this and other needs, and in view of its purposes, the present invention provides a method and associated system for using an acoustic sensor, such as an accelerometer, to detect the acoustic signal produced by physical interference with desired transport of an article being moved by a transport device through a predetermined path, such as a wafer being handled by a robot in a workstation. Specifically, the present invention provides a method for detecting physical interference with desired transport of an article, the method comprising:

a) detecting with an acoustic sensor an operative acoustic signal representing a structure-borne sound pattern of the article during transport; and b) detecting the presence of physical interference based on the acoustic signal;

wherein the acoustic sensor is in structure-borne acoustic contact with the article at least during the physical interference.

The invention also comprises a method for detecting physical interference with desired transport of an article when the article is moved by a transport device through a predetermined path, the method comprising:

a) storing a reference acoustic signal;

b) detecting a subsequent operative acoustic signal representing the structure-borne sound pattern of an article during its transport through the predetermined path;

c) comparing the operative acoustic signal with the reference signal; and d) detecting any differences between the reference signal and the operative signal and using the detected differences to determine the presence of interference during transport.

Step (a) may further comprise detecting a baseline acoustic signal representing the sound pattern generated during the transport of a sample article through the predetermined path without any physical interference and storing the baseline acoustic signal as the reference acoustic signal.

The method steps for detecting such physical interference may be performed by a system comprising:

a) a transport device adapted to transport the article through a predetermined path; and b) an acoustic sensor capable of producing an acoustic signal indicative of the physical interference, wherein the acoustic sensor is in structure-borne acoustic contact with the article at least during the physical interference.

The present invention also comprises a program storage device readable by a machine, tangibly embodying a program of instructions executable by the machine to perform method steps for detecting physical interference with desired transport of an article when the article is moved by a transport device through a predetermined path, the method steps comprising:

a) inputting and storing a baseline acoustic signal representing the structure-borne sound pattern generated during the transport of a sample article through the predetermined path without any physical interference;

b) inputting a subsequent operative acoustic signal representing a structure-borne sound pattern of an article during its transport through the predetermined path;

c) comparing the operative acoustic signal with the baseline signal; and d) detecting any differences between the baseline signal and the operative signal and using the detected differences to identify the physical interference.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 3 is a schematic illustration of a displacement curve derived from the output of an accelerometer mounted on a robotic arm while the arm performed motions with and without collisions.

DETAILED DESCRIPTION OF THE INVENTION

Figure 1:
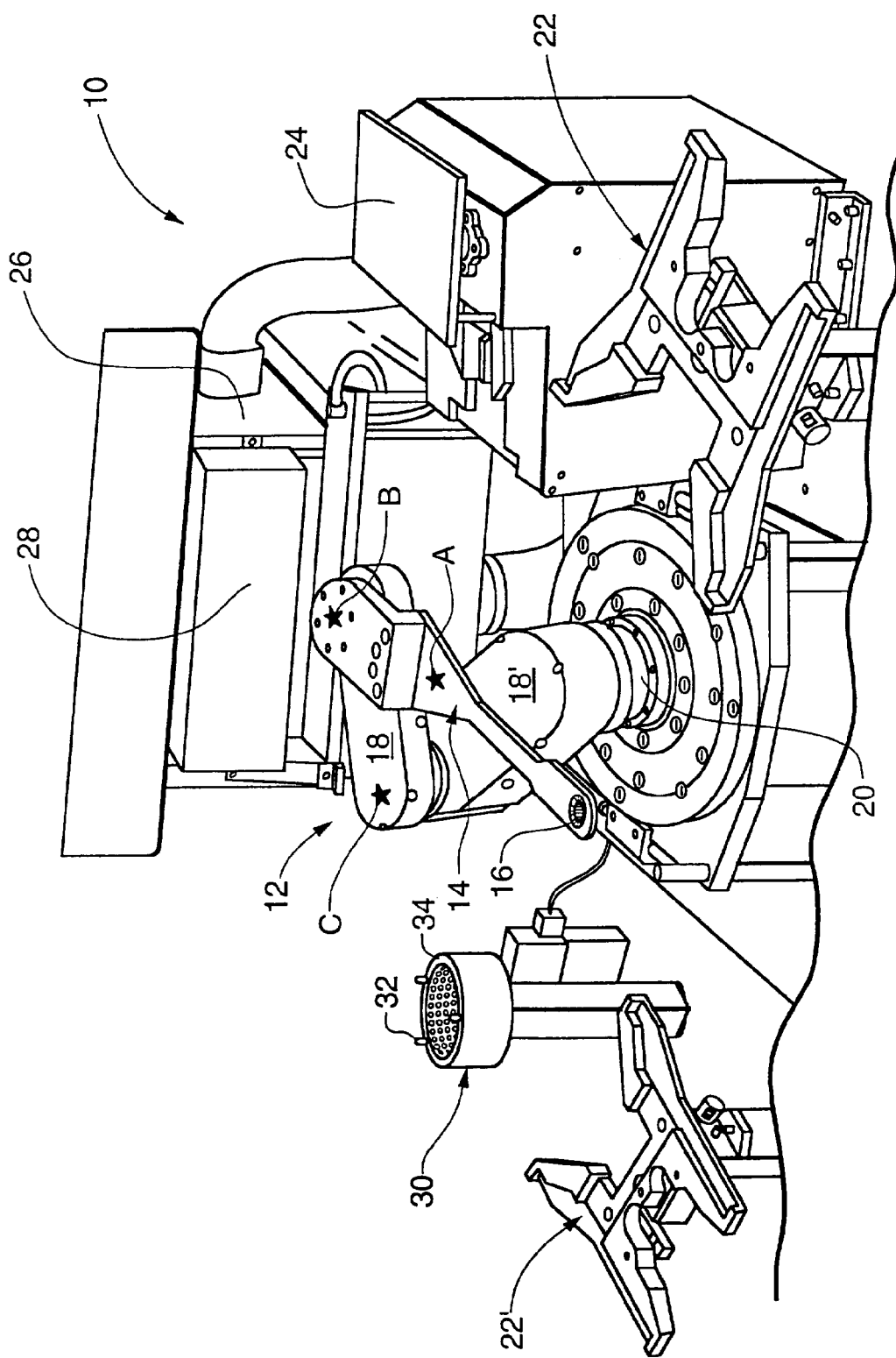
FIG. 1 is a schematic illustration of a typical semiconductor wafer processing tool that uses a robotic arm for moving wafers along predetermined paths to predetermined locations.
Figure 2:
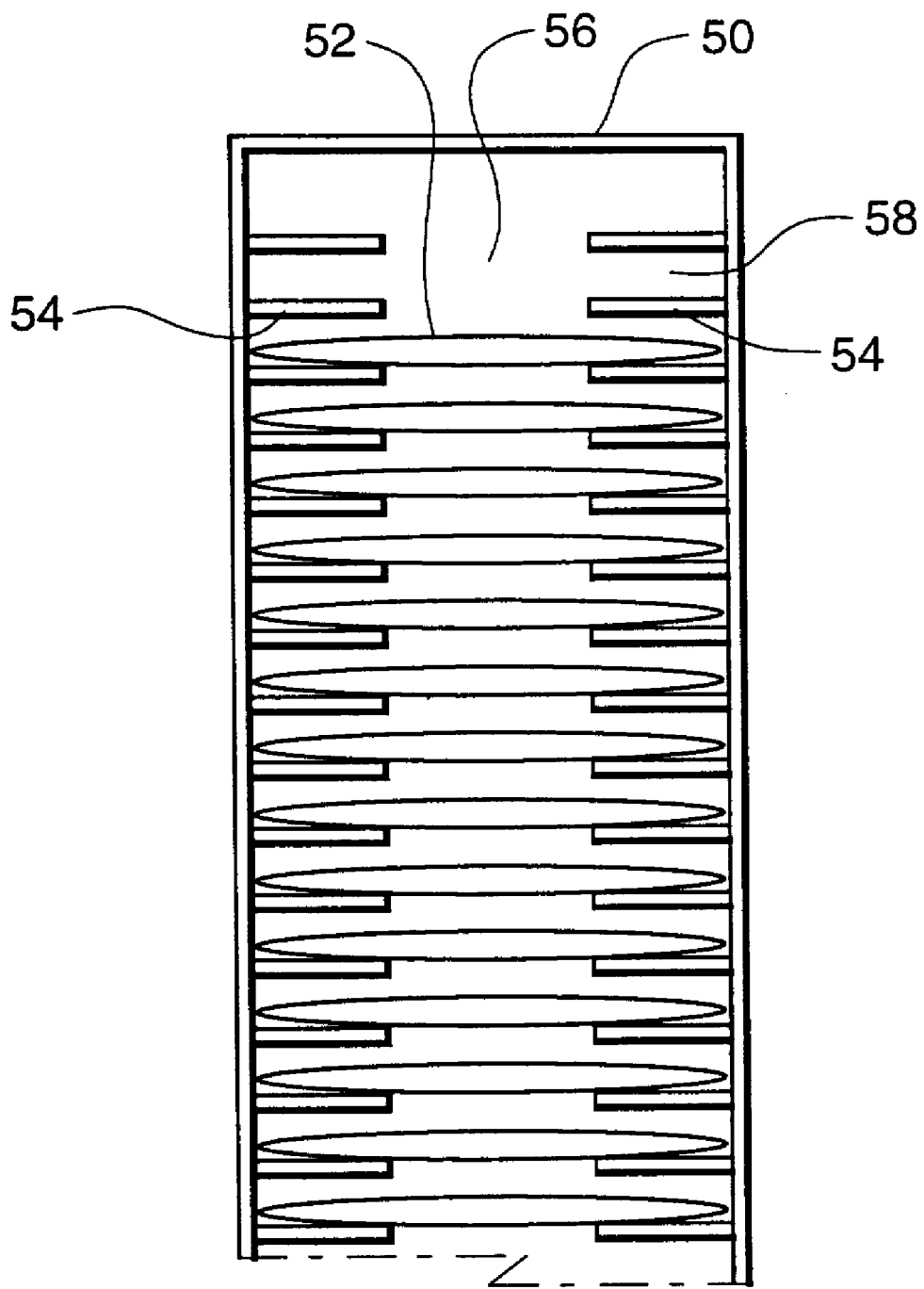
FIG. 2 is a schematic illustration of a wafer holding cassette typically used with the tool of FIG. 1 for holding wafers.

Referring now to the drawing, wherein like reference numerals refer to like elements throughout, FIGS. 1 and 2 illustrate a specific embodiment useful in handling wafers in a semiconductor manufacturing process. The wafers are picked up and transported between predetermined locations along predetermined paths using a robotic arm.

FIG. 1 shows an example of a robotic tool 10 typical of those that may be used with the present invention. In this case, the tool shown is a Rapid Thermal Processing tool, such as that used in silicon wafer processing for annealing dopants or for other heat-reactive processes in the manufacture of integrated circuit chip wafers. The articles handled are silicon wafers.

The robotic arm 12 of tool 10 as shown in FIG. 1 comprises an article-grasping portion 14 having a suction disk 16 at its terminal end. The suction disk is connected to a vacuum source that allows the article-grasping portion to firmly hold wafers from underneath using suction. The article-grasping portion 14 is rotationally attached to a first arm section 18, allowing 360° rotation in a single plane. First arm section 18 is in turn rotationally attached to a second arm section 18', also allowing 360° rotation in a single plane parallel to the plane of motion of article-grasping portion 14.

A piston 20 provides vertical movement of robotic arm 12. This series of connected arm sections gives robotic arm 12 a full range of rotational and translational movement within the work area. The structure of a robot to be used with the present invention may have any number of attached parts, however, comprising any number of degrees of freedom of movement.

As shown in FIG. 2, a cassette 50 holds a plurality of wafers 52, typically on the order of twenty-five wafers in an entire cassette. The wafers are held on fingers 54 that support each wafer on its opposite edges, thus leaving the center portion 56 free. Each set of fingers 54 creates a slot 58 into which a single wafer 52 fits. Such a cassette is held in one of the cassette stands 22 or 22' shown in FIG. 1. Sometimes a full cassette may be placed on cassette stand 22 and an empty cassette on stand 22', or vice versa. Other times, only a single cassette is used.

The robotic arm 12 takes wafers one at a time from a cassette held in one of the cassette stands 22 or 22', typically starting at the topmost wafer in a cassette and working downward. To pick up a wafer with article-grasping portion 14, robotic arm 12 moves article-grasping portion 14 into the center portion 56 of cassette 50 underneath a wafer 52 in the space between adjacent wafers. Air flows into suction disk 16 until contact is made with a wafer 52, thus creating a vacuum seal between suction disk 16 and a wafer (not shown). If no wafer is present, air flow will continue through suction disk 16 even when robotic arm 12 is in a position where a wafer should have been contacted to block the air flow, thus indicating to the robot controller that there is no wafer in that slot. In such case, robotic arm 12 moves to the next slot.

After securing wafer 52 on article-grasping portion 14, robotic arm 12 lifts the wafer vertically to clear contact with fingers 54, and then retracts the wafer from cassette 50. The wafer is then transferred to alignment station 24. In the alignment station, the wafer is set down on a collection of pins (not shown), and the suction is released between the wafer and the suction disk 16 of article-grasping portion 14. The article-grasping portion 14 is lowered so that only the pins support the wafer. At the alignment station, the wafer is rotated and translated by an alignment system to align a designated mark (not shown) on the wafer to a predetermined proper position. Once the alignment has been satisfied, the robot again secures the wafer by lifting it from underneath using suction disk 16 as previously described.

The robotic arm 12 then moves the wafer to heat chamber 26. The door 28 of the chamber opens, and the robotic arm inserts the wafer. The wafer is set down inside the heat chamber and released by article-grasping portion 14. The article-grasping portion retracts, and door 28 closes. Inside the heat chamber, the wafer sits upon pins (not shown) within a heat transfer ring (not shown) that contacts the wafer periphery.

At the end of the heat-processing step, the robotic arm secures the wafer, removes it from the heat chamber, and moves it to and sets it down upon a cooling station 30. At cooling station 30, the wafer rests on pins 32 while air blows through manifold 34. When the wafer is cool, robotic arm 12 again picks it up and transfers it to a cassette 50.

The return cassette may be the same cassette at the same cassette stand 22 or 22' that held the wafer before processing, or it may be a different cassette on the opposite stand from the one that originally held the wafer. Often, the process may start with an empty cassette on one stand and a full one on the other, and the processing of wafers proceeds until all the wafers have been transferred from the full cassette to the empty one.

During the processing of a single wafer at one portion of the tool, other wafers may be simultaneously processed. So, for instance, while one wafer is being cooled at cooling station 30, another may be in heat chamber 26, and still another may be in the alignment station 24.

Generally, during the transport of an article along a predetermined path by a transport device, such as the movement of a semiconductor wafer by robotic arm 12 between the various processes described above, some sort of physical interference with the desired transport may occur. As used in this specification, the term "physical interference" encompasses, but is not limited to, the following: collisions between the article and other objects, including parts of the transporting device; parts of the transporting device rubbing together; dropping of the transported article; collision or rubbing of any part of the transporting device with or against any adjacent structure; improper contact between the transporting device and the article; and improper operation due to accumulation of debris on or in the vicinity of the transporting device. In the particular application in which a robotic arm is used to grasp and transport a semiconductor wafer, physical interference includes the semiconductor wafer rubbing against the slots in the cassette, hitting a processing chamber wall, or the robotic arm touching the wafer in an undesired manner. Physical interference may be identified by a resulting acoustic signal differing from the expected acoustic signal for a given operation.

In most cases, the physical interference is slight in the sense that it does not pull excess current and shut down the robotic arm or otherwise register a problem by existing feedback control techniques. Because the wafers are very fragile and very complex on a microscopic scale, however, even the slightest nick or scratch on the surface of the wafer may render it unusable in part or in whole. Furthermore, rubbing of parts in the tool chamber creates foreign material, so even if the wafer itself is not directly hit, it may still be damaged by the presence of foreign material on its surface.

Therefore, the present invention comprises "listening" for vibrations that may indicate physical interference or a collision, preferably using an acoustic sensor sensitive to sound or vibration and attached to either the tool, the robotic arm, or even the outside of the tool chamber. The sensor may be a single-, dual-, or three-axis accelerometer such as a model ADXL150EM-3 manufactured by Analog Devices, Inc. of Norwood, Mass., or may be a sensitive microphone or other type of vibration detector. Such devices are capable of detecting even minute disturbances that may indicate physical interference.

Because the various structural parts of the system, including the wafer itself, are acoustically conductive, such a sensor may provide reliable information from a location virtually anywhere in the system. As long as the sensor is mounted where a structure-borne (as opposed to airborne) acoustic signal is conducted to the sensor from the point of physical interference, the structure-borne acoustic signal will reach the sensor. To increase sensitivity, however, sensors may be located closest to where physical interference is most likely.

The transport of an article by a transport device through a predetermined path, such as movement of a wafer by the robot in its standard motions through the processing steps within the tool, produces characteristic vibrations detected by the acoustic sensor or sensors and converted into an acoustic signal. Preferably, the present invention includes comparing an operative acoustic signal with a reference signal, such as a stored baseline acoustical signal. Storage, comparison, and input of the signals generated by the acoustic detector may be performed by a computer, a logic controller, or any program storage device that can be read by a machine, tangibly embodying a program of instructions that can be executed by the machine to perform the requisite method steps.

The baseline signal may be the result of detecting and storing the signal generated during a calibrating step, during which an article is transported along the predetermined path from a first location to a second location in the absence of any physical interference. The absence of physical interference may be assured by properly preparing the path and transport device and by actually observing the operation to determine the absence of any interference with the transport process. The acoustical signal generated through this operation is then stored to form the baseline signal.

Preferably, more than one calibrating acoustical signal will be generated and the baseline will be the result of averaging such signals. In such case, a statistical analysis may be performed on the resulting calibration acoustical signals to determine acceptable statistical limits to acceptable deviations from the average baseline against which to compare the operative signals during actual manufacturing use of the transport device. The development of such statistical limits permits quick and automated identification of unacceptable deviations from a normal signal. The identified unacceptable deviation may then trigger a proper response, ranging from simple activation of an alarm to a complete shut down of the operation.

The acoustical signal typically is a time-dependent signal whose duration is preferably coextensive with the duration of the article transport process. Although in its simplest form the acoustical signal may only have an amplitude which varies with time, preferably it will include both amplitude and frequency components. Still according to the present invention, information regarding the particular sounds generated by particular interferences is developed and stored, optionally, as part of the baseline acoustical signal. In this case, the type of physical interference can be determined by comparing the operative is signal amplitude and frequency spectrum to the frequency spectra in the stored baseline acoustical signal to identify the type of interference encountered.

A programmable controller or other program storage device, such as a computer, may perform the steps of inputting and storing the baseline and operative structure-borne acoustic signals, as well as comparing the signals and detecting differences between the signals. Deviations from the baseline acoustic signal may be a step change caused by a suddenly developing problem, or a gradual change, such as from an accumulation of deposited foreign material on system components. In a situation where the generation of the foreign material may for some reason escape detection, its effect on acoustic performance may be the factor that brings it to the attention of the control system.

Several preferred options for mounting the acoustic sensor on the robot itself are indicated by stars A, B, and C in FIG. 1. These suggested locations are not limiting; sensors could be placed in any number of locations, including locations on various parts of the semiconductor processing tool. Such locations may be on the heat chamber door 28, at cooling station 30, at alignment station 24, on the outside of the tool enclosure, or on the cassette 50, and the like. In such locations, the acoustic sensor will be in structure-borne acoustic contact with the wafer only during the moment of actual contact or physical interference. Any combination of sensor locations may be used. Placement somewhere on robotic arm 12 itself is advantageous, however, because a sensor in such a location is especially sensitive to physical interference involving the wafer at the end of the robotic arm.

Similarly, any physical interference from parts of the robot rubbing together, or even from a wafer falling off the article-grasping portion 14 can be easily detected by a sensor on robotic arm 12 itself. Thus when the acoustic sensor is placed, for instance, on the robotic arm in location A, B, or C, it is in structure-borne acoustic contact with the surface of the robotic arm and the surface of the wafer being held by the robot. As robotic arm 12 moves wafer 52 relative to the various objects that comprise tool 10, the surface of the wafer or the robotic arm itself may contact any of those objects, creating a vibration transmitted through the structure and detected by the acoustic sensor.

The acoustic sensors transmit signals to the robotic arm control device, and the robot motion may be halted whenever physical interference is detected, signifying a robot error. Alternately, the robot control device may merely log the errors for review later. Preferably, some combination of these options can be chosen so that errors classified as relatively minor or isolated are merely logged, but major or repeated errors shut the tool down until it can be inspected.

Referring again to FIGS. 1 and 2 for the specific tool configuration described above, review of the process reveals many places where physical interference of various forms may occur and b e detected as part of the operative acoustic signal. The difference between the operative acoustic signal with such interference and the baseline acoustic signal recorded without such interference indicates a robot error.

The motion of robotic arm 12 itself may produce rubbing at the joints between adjacent arm sections 18, 18' or article-grasping portion 14. Piston 20 may begin rubbing as it extends and retracts. Rubbing of parts against one another may create foreign material that can damage the wafer integrity. In performing the motions required to move a wafer, a non-article-grasping portion of the robot may strike another portion of the tool, such as the heat chamber 26. Again, foreign material may be created.

The step of picking up a wafer may cause physical interference. Naturally, the first moment of contact between a wafer 52 and article-grasping portion 14 produces an expected contact. This desirable contact is also part of the baseline acoustic signal, however, and is thus not identified as a difference from baseline. As robotic arm 12 lifts wafer 52 out of cassette 50, it may lift too far and produce physical interference, or it may not lift far enough and scrape fingers 54 with the wafer as it retracts. As article-grasping portion 14 enters the cassette it may rub against a wafer or the cassette wall.

As robotic arm 12 moves the wafer to alignment station 24, it may bump the wafer against another portion of the tool, or it may hit the walls as it enters the station, creating physical interference. Physical interference may come from the robotic arm setting the wafer down too hard on the pins. On the way to a station or at any time while the wafer is being transported, the wafer may fall off article-grasping portion 14, thus creating an undesirable scraping contact as it slides off.

As robotic arm 12 moves wafer 52 into heating chamber 26, door 28 may not completely open, thus causing a nicking or scraping contact between the wafer and the door. In the system described, the aperture created by the open door is typically only one-half inch wide, thus not allowing much room for error. The door itself may close improperly if parts are rubbing together. Rubbing parts anywhere in the tool system create potential foreign material. The chamber door may be in the form of a valve that produces a characteristic vibration when the valve contacts the valve seat upon closing. The normal vibration is part of the baseline acoustic signal, so any departure from the baseline acoustic signal in the operative acoustic signal may be regarded as emanating from physical interference.

Physical interference potentially detected by an acoustic or vibration sensor is not limited to what has been listed above. There may be other events detectable with respect to the specific process equipment described, and furthermore there may be events specific to other process equipment not described. The use of an acoustic or vibration sensor to detect robotic errors may be used not only for the equipment described and related to the Rapid Thermal Processing tool, but for equipment related to robotic processes in any aspect of semiconductor wafer processing. Such equipment may include, but is not limited to, the implanter, wet bench, clustered processing tool, furnace, inspection equipment, bay-to-bay automated product transport, within-bay product transport, Chemical Mechanical Polishing (CMP) equipment, lithography equipment, dry strip equipment, sputter equipment, electroplating equipment, and the like.

Similarly, the use of robots, robotic arms, or other robotic handling devices is not limited to the semiconductor processing industry. Therefore, the use of vibration or acoustic sensors to detect robot errors is applicable to any industry in which robots are used. Furthermore, the need to detect undesired contact is not limited to processes involving robots. Other mechanical, or even non-mechanical transport devices, may need to detect physical interference with desired transport of an article being transported by a the transport device. This need may be solved by placing an acoustic sensor on a surface in acoustically conductive contact with either the transporting device or with the object likely to cause the physical interference, in accordance with the present invention.

EXAMPLE

The following example is included to more clearly demonstrate the overall nature of the invention. This example is exemplary, not restrictive, of the invention.

A dual-axis micro-machined accelerometer, model ADXL250 manufactured by Analog Devices, Inc. of Norwood, Mass., was attached to a robotic arm and its signal output attached to a computer readout using ADXL202EB-232 Demo Software, also by Analog Devices, Inc. The robotic arm performed a sliding motion without a collision, and then performed the same motion with a collision. Referring now to FIG. 3, there is illustrated the output curve from the accelerometer during these motions.

Output curves 70 and 72 represent the displacement signal in the X (70) and the Y (72) direction produced by the software from the double integral of the acceleration as sensed by the accelerometer and input to the computer. The curve shows the signal response to robotic motions without a collision 74 and 74' and the same robotic motion with a collision 76 and 76'. As shown, the displacement curves clearly show peaks 78 during colliding motions 76 and 76' that are not present during non-colliding motions 74 and 74'. To induce the collision, the robotic motion was performed at faster velocity, resulting in the compressed time scale of the signals from the motions with a collision. Periods of rest with no motion (and no collision) show a flat line 75. In an industrial application, slight differences in the signals during non-colliding motions 74 and 74' can be accommodated with signal processing filters to avoid false collision indications.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method for detecting physical interference with desired transport of an article, the method comprising:
    a) detecting with an acoustic sensor an operative acoustic signal representing a structure-borne sound pattern of said article during transport; and
    b) detecting the presence of physical interference based on said acoustic signal;
    wherein said acoustic sensor is in structure-borne acoustic contact with said article at least during said physical interference.

2. The method according claim 1 wherein the acoustic sensor is in physical contact with an object that produces said physical interference.

3. The method according claim 2 wherein the article is transported by the transport device between stations external to the transport device and wherein step (a) includes using an acoustic sensor in physical contact with at least one of said stations.

4. The method according to claim 1 wherein step (a) includes using a transport device to transport said article wherein the acoustic sensor is in physical contact with the transport device.

5. The method according to claim 4 wherein the article is a workpiece and step (a) includes using a mechanical device as the transport device for transporting said workpiece.

6. The method according to claim 5 wherein the mechanical device is a robotic device.

7. The method according to claim 6 wherein the workpiece is a semiconductor wafer and step (a) comprises detecting the structure-borne acoustic signal representing the sound pattern generated during the transport of said wafer.

8. The method according to claim 7 further comprising transporting said wafer through a semiconductor process tool.

9. The method according to claim 8 wherein said semiconductor process tool comprises at least one of a Rapid Thermal Processing tool, an implanter, a wet bench, a clustered processing tool, a furnace, inspection equipment, bay-to-bay automated product transport, within-bay product transport, CMP equipment, lithography equipment; dry strip equipment, sputter equipment, and electroplating equipment.

10. The method according to claim 8 wherein step (b) further comprises detecting physical interference comprising at least one of colliding, rubbing, scratching, and slipping.

11. The method according to claim 8 wherein step (b) further comprises detecting physical interference comprising at least one of a collision between the wafer and another object; improper contact between the wafer and the robotic device; the wafer colliding with adjacent structure; the wafer rubbing against adjacent structure; the wafer rubbing against slots within a cassette; two portions of said robotic device rubbing against each other; a wafer dropping off said robotic device; said robotic device rubbing against a portion of said process tool; two parts of said process tool colliding with one another; and improper operation caused by accumulated debris.

12. The method according to claim 1 further comprising responding to said physical interference by recording the occurrence of said physical interference in an error log.

13. The method according to claim 1 further comprising responding to said physical interference by stopping movement of said transported article based on detection of said structure-borne acoustic signal produced by said physical interference.

14. The method according to claim 1 wherein step (a) includes using an accelerometer as said acoustic sensor.

15. A method for detecting physical interference with desired transport of an article when said article is transported by a transport device through a predetermined path, the method comprising:
    a) storing a reference acoustic signal;
    b) detecting a subsequent operative acoustic signal representing a structure-borne sound pattern of an article during said article transport of said article through said predetermined path;
    c) comparing the operative acoustic signal with the reference signal; and
    d) detecting any differences between the reference signal and the operative signal and using said detected differences to determine the presence of interference during said transport.

16. The method according to claim 15, wherein step (a) further comprises detecting a baseline acoustic signal representing a sound pattern generated during transport of a sample article through said predetermined path without any physical interference and storing said baseline acoustic signal as said reference acoustic signal.

17. The method according to claim 15 wherein step (b) includes using an acoustic sensor in physical contact with the transport device.

18. The method according to claim 17 wherein step (b) includes using an accelerometer as said acoustic sensor.

19. The method according to claim 15 wherein step (a) further includes detecting a plurality of acoustic signals representing structure-borne sound patterns generated during transport of a plurality of sample articles through said predetermined path without any physical interference, and storing an average of said plurality of structure-borne acoustic signals as said reference acoustic signal.

20. The method according to claim 19 further comprising establishing a predetermined acceptable deviation from the reference acoustic signal and producing an error signal whenever comparing the operative acoustic signal with the reference acoustic signal reveals a difference therebetween in excess of the acceptable deviation between said reference acoustic signal and said operative acoustic signal.

21. The method according to claim 15 wherein step (b) includes detecting and storing an amplitude and a frequency spectrum of said signal.

22. The method according to claim 21 wherein step (a) includes storing both an amplitude and a frequency spectrum of said reference signal, step (b) includes detecting both an amplitude and a frequency spectrum of said operative acoustic signal, and wherein step (c) includes comparing the frequency spectrum of the operative acoustic signal to the frequency spectrum of the reference acoustic signal.

23. The method according to claim 22 further including the step of identifying specific acoustic signal frequency spectra corresponding to specific physical interferences and wherein step (c) includes comparing the operative acoustic signal frequency spectrum with the identified specific acoustic signal frequency spectra corresponding to specific physical interferences, to identify the physical interference giving rise to the operative acoustic signal.

24. The method according to claim 15 wherein the reference signal comprises identified specific acoustic signal frequency spectra corresponding to specific physical interferences and wherein step (c) includes the step of comparing the operative acoustic signal frequency spectrum with the identified specific physical interference frequency spectra to identify the physical interference giving rise to the operative acoustic signal.

25. A system adapted to detect physical interference with desired transport of an article, the system comprising:
   a) a transport device adapted to transport the article through a predetermined path; and
   b) an acoustic sensor capable of producing an acoustic signal indicative of said physical interference, wherein said acoustic sensor is in structure-borne acoustic contact with said article at least during said physical interference.

26. The system according to claim 25 wherein said acoustic sensor is in physical contact with said transport device.

27. The system according to claim 25 wherein said acoustic sensor is in physical contact with an object that produces said physical interference.

28. The system according to claim 25 further comprising:
   c) a controller programmed to store a baseline acoustic signal from said acoustic sensor representing a structure-borne sound pattern generated during the transport of a sample article through said predetermined path without physical interference; to receive an operative acoustic signal from said acoustic sensor representing the structure-borne sound pattern of an article during its transport through said predetermined path; to compare the operative acoustic signal with the baseline signal; and to detect any differences between the baseline signal and the operative signal and use said detected differences to identify said physical interference.

29. The system according to claim 25 wherein said transport device is a mechanical handling device.

30. The system according to claim 29 wherein said mechanical handling device is a robotic handling device.

31. The system according to claim 30 wherein said robotic handling device is a first element of a semiconductor processing tool and said article is a semiconductor wafer being handled by said robotic handling device.

32. A program storage device readable by a machine, tangibly embodying a program of instructions executable by the machine to perform method steps for detecting physical interference with desired transport of an article when said article is transported by a transport device through a predetermined path, said method steps comprising:
   inputting and storing a baseline acoustic signal representing a structure-borne sound pattern generated during the transport of a sample article through said predetermined path without any physical interference;
   inputting an operative acoustic signal representing a structure-borne sound pattern of an article during transport of said article through said predetermined path;
   comparing the operative acoustic signal with the baseline signal; and
   detecting any differences between the baseline signal and the operative signal and using said detected differences to identify said physical interference.

* * * * *